United States Patent [19]

Köster et al.

[11] 4,006,505

[45] Feb. 8, 1977

[54] SLIDING SWING SUPPORT FOR BRIDGES OR SIMILAR SUPPORTING STRUCTURES

[75] Inventors: Waldemar Köster, Forsbach, Germany; Reinhold Huber, Rorbas, Switzerland

[73] Assignee: Kober AG, Glarus Schweiz-Spielhof, Germany

[22] Filed: July 8, 1975

[21] Appl. No.: 594,060

[30] Foreign Application Priority Data

July 9, 1974 Germany .......................... 2432898

[52] U.S. Cl. ................................ 14/16.1; 248/22; 308/3 R
[51] Int. Cl.² ......................................... E01D 19/06
[58] Field of Search ................... 14/16 B; 248/22; 308/3 R

[56] References Cited

UNITED STATES PATENTS

| | | | |
|---|---|---|---|
| 3,243,236 | 3/1966 | Graham | 14/16 B |
| 3,728,752 | 4/1973 | Andra | 14/16 B |
| 3,806,975 | 4/1974 | Fyfe | 14/16 B |

FOREIGN PATENTS OR APPLICATIONS

| | | | |
|---|---|---|---|
| 2,114,391 | 10/1972 | Germany | 14/16 B |
| 2,043,448 | 3/1972 | Germany | 14/16 B |

*Primary Examiner*—Nile C. Byers

[57] ABSTRACT

A sliding swing bearing in which a resilient cushion is interposed between a pair of supports, at least one of which is movable. The cushion is provided with a load-absorbing insert, of a harder material, spaced about its periphery, which are only partially embedded in the cushion and extend radially outward. The cushion is enclosed by an annular ring casing, the wall of which is formed so as to receive and engage the extending portion of the insert.

13 Claims, 5 Drawing Figures

SLIDING SWING SUPPORT FOR BRIDGES OR SIMILAR SUPPORTING STRUCTURES

BACKGROUND OF THE INVENTION

The invention relates to a sliding swing support for bridges or similar supporting structures.

Swing supports are known and have a top support section and a bottom support section with a pressure pad interposed therebetween. The pressure pad is encircled by a ring which also encircles the swing-side support section, and is secured in position, boxed and sealed to the outside by this ring.

With a well-known support of this type (see German disclosure DT-AS 2 007 767), the ring encircling the pressure pad takes the form of a shoulder passing round and engaging in the pressure pad at its end remote from the swing-side support section, which together with a groove running round the inside circumference of the ring serves to secure the ring in position in relation to the pressure pad. The advantage of using a groove, however, is not very great, since it is not very deep and it is in an unfavorable position, namely at a medium height on the circumference of the pressure pad, where, unlike in its region adjacent to the shoulder, only slight movement of material occurs. On the other hand, the corner of the shoulder of the ring inside the above-mentioned pad projects so far into the inside of the pressure pad, that as a result of the movement of material present, increased wear of the pad occurs. Consequently, in the case of the well-known support, the conditions of the so-called cup support, by which the pressure pad is enclosed on all sides by the cup wall and the swing-side support section, which are favorable with regard to the deformation of the pressure pad, are not achieved.

With another type of well-known support, a so-called rubber support (see German Disclosure DT-AS 2 063 745), the pressure pad is encircled by a ring, only partly enclosing the circumference of the pad. The ring has a groove at medium height, into which is engaged a suitable bead or ridge formed on the pressure pad. Rubber supports of this kind are suitable only for small vertical loads and therefore cannot be compared as a class with the cup supports which are used for substantially higher loads. With the well-known support, the strength requirements of the groove/ridge connection are therefore minimal.

It is an object of the present invention to provide a bearing of the described type in which the ring is kept perfectly in position in relation to the pad without preventing the deformation of the pressure pad.

SUMMARY OF THE INVENTION

According to the present invention, a sliding swing bearing is provided comprising upper and lower supporting members having an elastic pressure pad or cushion disposed therebetween. The elastic cushion is at least in part enclosed by a peripheral wall or casing ring and is provided with at least one insert of a material less resilient than the elastic of the pressure pad spaced about the periphery thereof adjacent the one support which is movable. The insert is partially embedded in the pressure pad and partially extends radially outward within the peripheral wall casing or ring.

Inserts of this kind guarantee a durable and particularly strong connection between the pressure pad and the ring. The support manages without a cup bottom but nevertheless equals the well-known cup support in its properties, whilst obtaining a high strength connection between the ring and the pressure pad without deformation and wear of the pressure pad material.

A particular advantage of the support in accordance with the invention is that a separate seal is not necessary. The inserts form at the same time the seal for the pressure pad between it and the sliding support.

A particularly advantageous arrangement of the invention consists in the inserts taking the form of lamellas embedded annularly within the pressure pad. The inserts thus may consist of individual lamellas in the form of metal-hard plates, which are arranged in ring-shaped distribution in front of the sliding side gap allowing movement in the pressure pad.

A further form of the invention takes the form of the inserts being deformable in themselves. In accordance with this form, the inserts preferably take the form of spirals of wire. Within the scope of the invention, such spirals of wire, defining a plurality of thin metal sheets, which cannot be easily deformed or hardly so, may be embedded in the pressure pad, so that it can be deformed circumferentially, i.e. by narrowing of the pressure pad, which is essential in obtaining a positive connection between ring and pressure pad.

In the case of a support of the type covered by the invention designed for heavy loads, it is advisable for the pressure pad material surrounding the insert to be reinforced in relation to the rest of the pressure pad. In the case of a pressure pad of rubber, it may be a case of higher Shore hardnesses within the scope of the invention.

A further form of the invention using a sliding layer of for example, PTFE, provides for the inserts to be directly adjacent either the sliding layer or a stiff plate arranged between sliding layer and pressure pad supported by a shoulder of the ring. The latter alternative ensures better boxing of the PTFE, as the stiff plate guarantees a uniform pressure distribution on the underside of the PTFE layer.

The invention can be used in connection with the use of various types of supports, such as for instance a fixed support, insofar as a pressure pad is enclosed on all sides and provides a support section engaging the inside of the peripheral ring supported on the surface forming the swing side in relation to the pressure pad.

BRIEF DESCRIPTION OF THE INVENTION

The invention is described below by means of the drawing, wherein

DETAILED DESCRIPTION OF THE INVENTION

Figure 1:
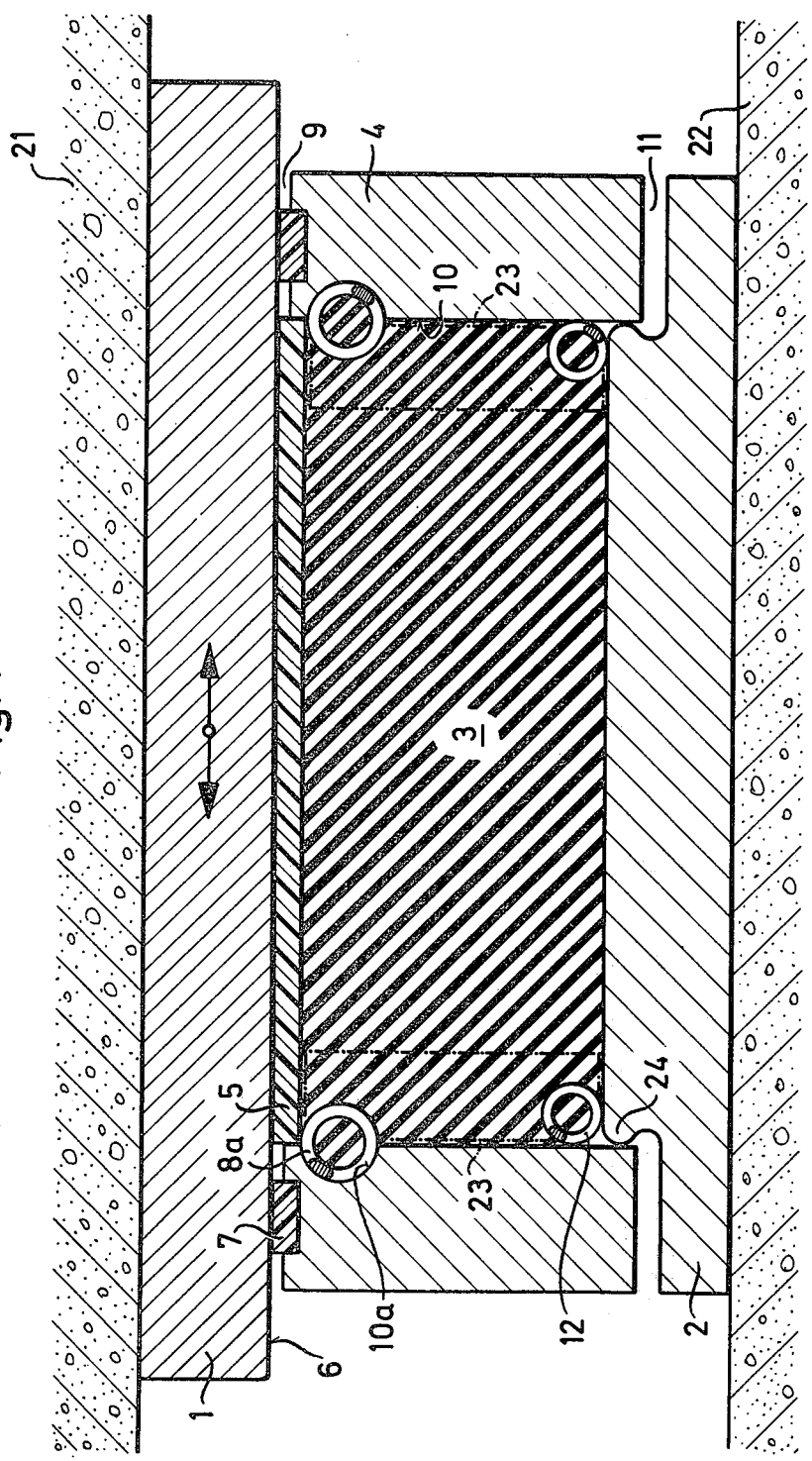
FIG. 1 shows a vertical cross-section through a sliding swing support.

With the support illustrated in FIG. 1, the structure 21 exerts its load on a top support member 1 which is the sliding side. The load is transferred to a foundation 22 via a bottom support member 2 forming the swing side. Swinging movements of the structure are absorbed by the pressure pad 3, which is enclosed by the top support section 1, bottom support section 2 and a peripheral casing ring 4. The bottom support section 2 has a laterally convex shaped upper part 24, which extends inside the ring 4. The top support section 1 is supported on the pressure pad, so that is can move horizontally, whilst a sliding layer 5 preferably in the form of a boxed sheet of P.V.C. or PTFE, which serves to reduce the frictional forces, is arranged between pressure pad 3 and top support section 1. Ring 4 is pressed against the underside 6 of the top support member 1. A PTFE annular layer 7 is inserted between its front face and the sliding support member.

Figure 5:
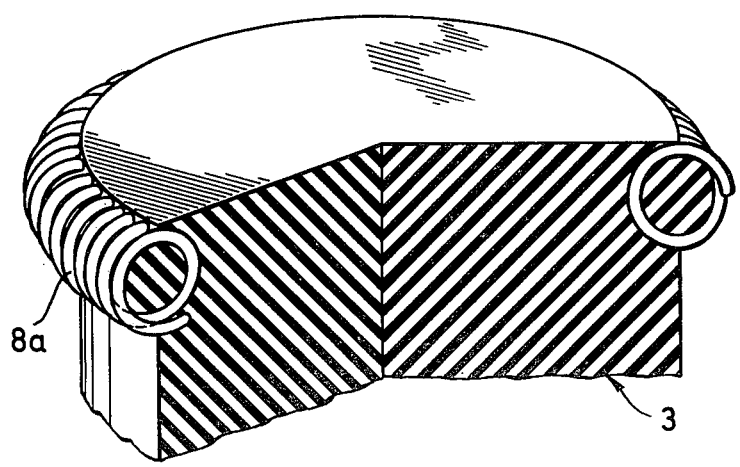
FIG. 5 shows a vertical partial section of the pressure pad with inserts taking the form of spirals of wire.

The transfer of forces from the pressure pad 3 to the ring 4 is effected by means of the spiral of wire 8a (see FIG. 5) embedded in the region near the top edge of the pressure pad 3. The spiral of wire 8a, preferably vulcanized in situ with the formation of the pressure pad, passes about the entire circumference of the pad between the top section of support 1 and the ring 4 within the gap 9 formed to allow movement between the members. At the same time the spiral insert acts as a seal against the protrusion of pressure pad material. The laterally projecting halves of the spiral wire extending radially from the pressure pad, engage in a suitably shaped groove 10a on the inside peripheral surface 10 of ring 4. The gap 11 allowing movement between the bottom support member 2 and the ring 4, is sealed by means of another spiral wire 12 of smaller dimensions, completely embedded in the pressure pad. The wire spirals can, of course, be replaced by differently shaped, elastically deformable inserts. Wire spirals with non-circular cross-section also may be used. The pressure pad 3 itself may be reinforced in its peripheral region 23.

Figure 4:
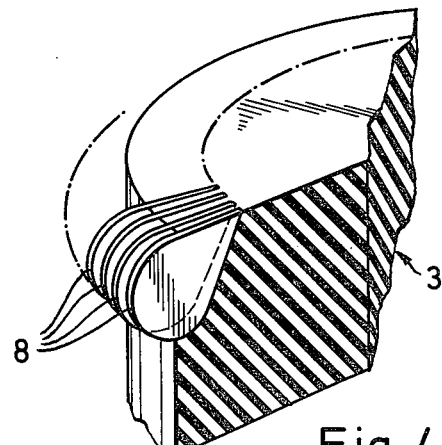
FIG. 4 shows a vertical partial section of the pressure pad with inserts taking the form of lamellas.

Fig. 4 shows resilient plate like individual lamellas 8 which may be used instead of said spiral of wire 8a.

Figure 2:
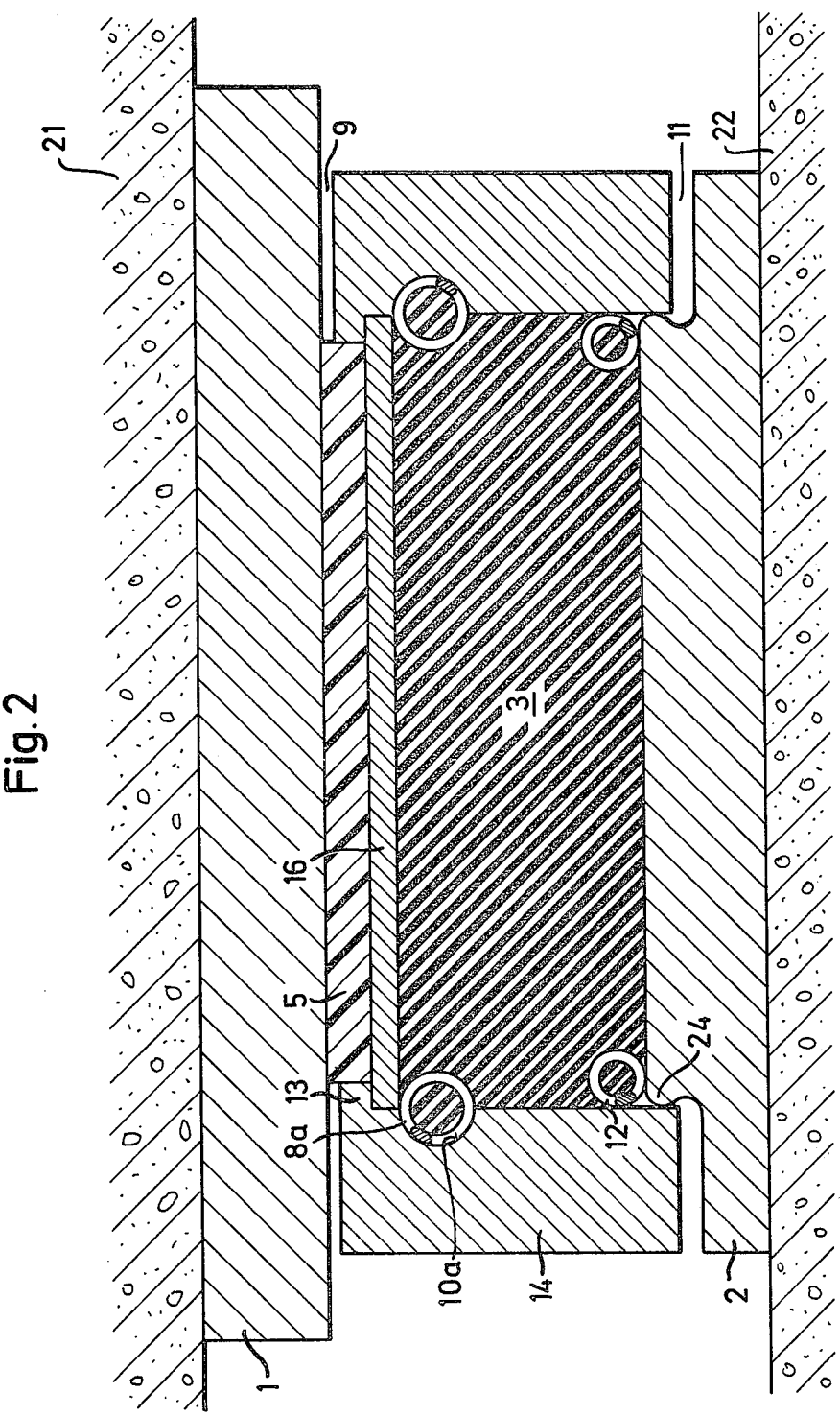
FIG. 2 shows a vertical partial section through another type of sliding swing support.

In the embodiment of FIG. 2, the pressure pad 3 on the side of the sliding layer 5, is covered by a stiff plate 16, preferably a steel plate. A shoulder 13 projects inwardly from the ring 14, to overly the stiff plate 16 holding it firmly to the side of the pressure pad. The shoulder 13 engages the edge of the PTFE layer and with the stiff plate 16 consequently forms the boxing required for the PTFE layer. The remaining elements of FIG. 2 are in accordance with those shown in FIG. 1.

Figure 3:
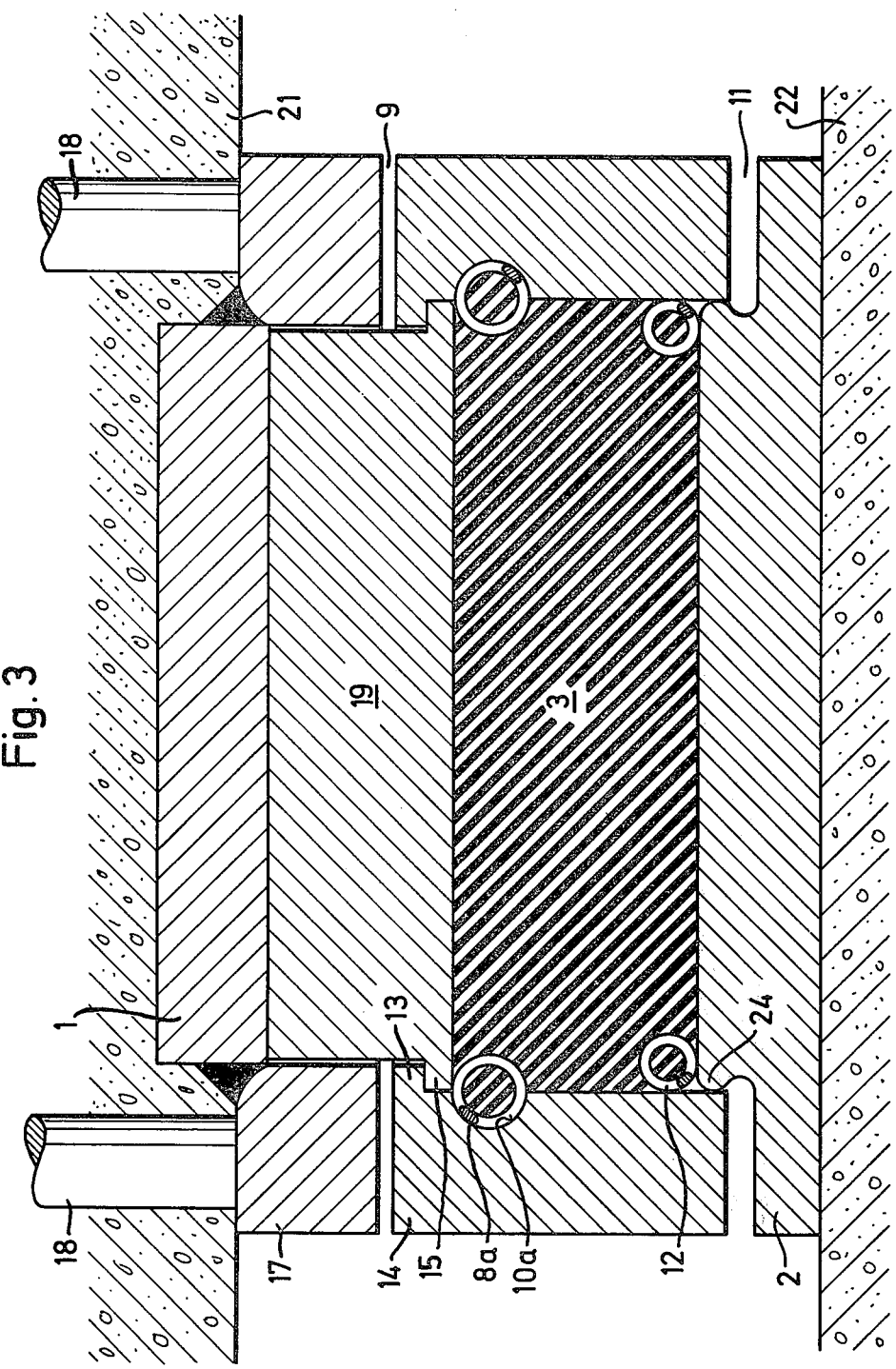
FIG. 3 shows a vertical partial section through a swing support as fixed support.

FIG. 3 shows a partial vertical cross-section through an embodiment having a fixed support 1, and a cover plate 19 interposed between it and the pressure pad 3. The cover 19 is held in place by being provided with a radial edge 15 gripped below the shoulder 13 of the ring 14 already mentioned in relation to FIG. 2. The cover plate 19 has a bulge 20 turned towards the top support plate 1 which engages in a recess formed by a frame 17 fixed to the cover plate and the support plate 1, and is thus secured in position. The frame 17, which can be in the form of a closed ring or of a rectangular shape, is anchored in the structure by means of the anchorage 18. If the frame 17 has two straight sides, it is possible to maintain the support so as to be displaceable in a direction parallel to the frame. For this purpose, a further sliding layer (not shown) may be needed between cover plate 19 and top support plate 1. The insert, illustrated by the special wire 8a or lamellae, such as the plates 8, may be of any material harder than that of the pad 3 material, forming the cushion interposed between the slidable support 1 and the fixed support 2. Hard metal, such as spring steel, may be used for their elastic resilient characteristics, as well as hard plastics and the like. The lamellae 8 (FIG. 4) are discrete plate like members of curved shape. Separate disks or other shaped plates or flat members may be used. It is observed that the lamellae, plates or even the spiral turns, are uniformly spaced with their planes running perpendicularly and radially to the wall of the ring forming the enclosing casing for the pad. The wall casing surrounds the partially embedded and partially extending inserts, and is formed with an annular groove or similar receiving well or opening so that the inserts fit therein. Preferably, the inserts are vulcanized or formed in situ with the rubber or plastic material of the pressure pad or cushion to form a uniform assembly. They may, however, be made separately and set into place by glue, or similar adhesive means. The reinforcement of the cushion or pad illustrated by the numeral 23 may be made by vulcanizing the periphery of the cushion or pad, with the reinforcement in place or by adding a reinforcing network of metal or plastic thereafter or by similar known techniques.

What we claim is:

1. A sliding swing bearing comprising upper and lower supporting members and an elastic cushion disposed therebetween, one of said supporting members being movable with respect to said cushion and the other one of said supporting members, said elastic cushion being at least in part enclosed by a peripheral wall casing and being provided with at least one insert of a material less resilient than said cushion spaced about the periphery thereof adjacent the movable support, said insert being partially embedded in said cushion and partially extending radially outward within said wall casing, said casing being formed with means for receiving said insert.

2. The bearing according to claim 1, wherein said inserts are formed of metallic material.

3. The bearing according to claim 1, wherein said inserts are formed of plastic.

4. The bearing according to claim 1, wherein said casing is provided with a recess for receiving said inserts.

5. The bearing according to claim 1, wherein the inserts comprise a plurality of discrete plates.

6. The bearing according to claim 1, wherein the inserts comprise a series of lamellae spaced uniformly about the periphery of the cushion.

7. The bearing according to claim 1, wherein the insert comprises a spiral extending annularly about the periphery of said cushion.

8. The bearing according to claim 1, including an insert spaced about the periphery of said cushion adjacent the non-movable support.

9. The bearing according to claim 1, wherein said cushion is reinforced at least in the area surrounding said inserts.

10. The bearing according to claim 1, including a layer of slidable material interposed between said cushion and said movable support.

11. The bearing according to claim 10, wherein said inserts are disposed to engage said layer.

12. The bearing according to claim 10, including a rigid plate arranged between said layer and said cushion and engaging said inserts.

13. The bearing according to claim 1, wherein said inserts are resiliently deformable.

* * * * *